(12) United States Patent
Ragan

(10) Patent No.: US 10,246,267 B2
(45) Date of Patent: Apr. 2, 2019

(54) INCLINED-ROLLER DESTACKER

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/782,376

(22) Filed: Oct. 12, 2017

(65) Prior Publication Data

US 2018/0029805 A1    Feb. 1, 2018

Related U.S. Application Data

(63) Continuation of application No. PCT/US2016/026927, filed on Apr. 11, 2016.
(Continued)

(51) Int. Cl.
| | |
|---|---|
| *B65G 47/28* | (2006.01) |
| *B65G 17/24* | (2006.01) |
| *B65G 21/10* | (2006.01) |
| *B65G 47/14* | (2006.01) |
| *B65G 39/10* | (2006.01) |

(Continued)

(52) U.S. Cl.
CPC ............ *B65G 47/28* (2013.01); *B65G 17/24* (2013.01); *B65G 21/10* (2013.01); *B65G 39/10* (2013.01); *B65G 43/08* (2013.01); *B65G 47/1492* (2013.01); *B65G 59/12* (2013.01); *B65C 9/02* (2013.01)

(58) Field of Classification Search
CPC ........ B65G 47/28; B65G 39/10; B65G 43/08; B65G 59/12

USPC .................. 198/780–791, 779, 861.1, 861.5
See application file for complete search history.

(56) References Cited

U.S. PATENT DOCUMENTS

| | | | |
|---|---|---|---|
| 3,627,091 A | | 12/1971 | Fleischauer et al. |
| 3,902,589 A | * | 9/1975 | Bylsma .................. B65G 13/04 |
| | | | 198/790 |

(Continued)

FOREIGN PATENT DOCUMENTS

| | | |
|---|---|---|
| DE | 9417627.2 U1 | 12/1994 |
| EP | 2072423 A1 | 6/2009 |

(Continued)

OTHER PUBLICATIONS

Extended European Search Report, European Application No. 16793125.2, dated Dec. 7, 2018, European Patent Office, Munich, Germany.

*Primary Examiner* — William R Harp
(74) *Attorney, Agent, or Firm* — James T. Cronvich

(57) ABSTRACT

A destacking conveyor and a method for destacking stacked articles, such as parcels and envelopes. The destacking conveyor comprises an inclined array of rollers that are arranged to rotate on axes perpendicular to a conveying direction. The conveyor is divided along its length into continuous roller-activation zones and selectively activated zones. In the continuous zones, the rollers always rotate in the conveying direction. In the selectively activated zones, the rollers are activated to rotate in the conveying direction and deactivated to be freely rotatable and allow articles to slide backward by gravity. The conveyor also includes a lift to change its inclination angle. By regulating the inclination angle and the activation and deactivation of the rollers in the selectively activated zones, piggy-backed articles slide off bottom articles.

19 Claims, 4 Drawing Sheets

Related U.S. Application Data

(60) Provisional application No. 62/161,312, filed on May 14, 2015.

(51) Int. Cl.
*B65G 43/08* (2006.01)
*B65G 59/12* (2006.01)
*B65C 9/02* (2006.01)

(56) References Cited

U.S. PATENT DOCUMENTS

| | | | |
|---|---|---|---|
| 5,069,440 A * | 12/1991 | Lazzarotti | B65G 47/2445 198/415 |
| 5,069,740 A | 12/1991 | Lazzarotti et al. | |
| 5,201,397 A * | 4/1993 | Isaacs | B07C 1/04 198/395 |
| 5,333,738 A | 8/1994 | Fuchs et al. | |
| 5,363,950 A | 11/1994 | Lacuna et al. | |
| 5,655,667 A * | 8/1997 | Isaacs | B07C 1/04 198/460.1 |
| 5,687,831 A | 11/1997 | Carlisle | |
| 6,491,154 B2 * | 12/2002 | Ydoate | B65G 47/31 198/444 |
| 7,344,018 B2 | 3/2008 | Costanzo et al. | |
| 7,784,601 B2 | 8/2010 | Riddick et al. | |
| 8,109,384 B2 | 2/2012 | Pressler et al. | |
| 8,342,313 B2 | 1/2013 | Wargo et al. | |
| 9,061,830 B2 | 6/2015 | Miller et al. | |
| 9,199,281 B2 | 12/2015 | Fourney et al. | |
| 9,776,796 B2 * | 10/2017 | Tanz | B65G 15/58 |
| 2008/0116039 A1 | 5/2008 | Ainsworth | |
| 2016/0280464 A1 | 9/2016 | Tanz | |

FOREIGN PATENT DOCUMENTS

| | | |
|---|---|---|
| FR | 2637877 A1 | 4/1990 |
| GB | 842214 A | 7/1960 |
| GB | 2168625 A | 6/1986 |
| JP | 6241753 U | 3/1987 |
| JP | 63131904 U | 8/1988 |
| JP | H04267977 A | 9/1992 |
| JP | 05319551 A | 12/1993 |
| JP | H08131963 A | 5/1996 |
| JP | 09085179 A | 3/1997 |
| JP | 11059882 A | 3/1999 |
| JP | 2001019145 A | 1/2001 |
| JP | 2001191033 A | 7/2001 |
| JP | 3546311 B2 | 7/2004 |
| JP | 2005225617 A | 8/2005 |
| JP | 2006218466 A | 8/2006 |
| JP | 2007098298 A | 4/2007 |
| JP | 2008280156 A | 11/2008 |
| WO | 2006020707 A2 | 2/2006 |

* cited by examiner

INCLINED-ROLLER DESTACKER

BACKGROUND

The invention relates generally to power-driven conveyors and more particularly to selectively activated inclined rollers.

In the parcel-handling industry masses of parcels and envelopes are conveyed to processing stations that perform specific functions, such as applying or reading labels. Many such processing stations can handle only one parcel at a time. So stacked parcels and envelopes must be separated for proper handling.

SUMMARY

One version of a destacking conveyor embodying features of the invention comprises an array of rollers arranged to form an inclined conveying plane extending in a conveying direction from a lower infeed end of the conveyor to an opposite upper discharge end at an inclination angle. The rollers are rotatable about axes perpendicular to the conveying direction. The array of rollers includes a first set of the rollers in a first zone extending in the conveying direction from the lower infeed end a first distance defining the upper end of the first zone and a second set of the rollers in a second zone extending in the conveying direction from the upper end of the first zone a second distance defining the upper end of the second zone. The first set of rollers in the first zone are continuously activated to rotate in the conveying direction. An actuator selectively activates the second set of rollers in the second zone to rotate in the conveying direction and selectively deactivates the second set of rollers to rotate freely about their axes.

Another version of a destacking conveyor comprises a roller-top conveyor belt advancing in a conveying direction along a carryway inclined at an inclination angle from a lower infeed end to an upper discharge end. The roller-top conveyor belt includes article-supporting rollers that extend through the thickness of the roller-top conveyor belt. A first stationary bearing surface underlies the roller-top conveyor belt in a first zone that extends in the conveying direction from the lower infeed end to an upper end of the first zone. The rollers passing through the first zone roll on the first stationary bearing surface to propel articles atop the rollers along the roller-top conveyor belt in the conveying direction. A second bearing surface underlies the roller-top conveyor belt in a second zone that extends in the conveying direction from the upper end of the first zone to an upper end of the second zone. The second bearing surface is movable from a first position in contact with the rollers passing through the second zone to a second position out of contact with the rollers. An actuator selectively activates the rollers passing through the second zone to rotate in the conveying direction by moving the second bearing surface to the first position and selectively deactivates the rollers passing through the second zone to rotate freely about their axes by moving the second bearing surface to the second position.

Yet another version of a destacking conveyor comprises a set of rollers arranged to form an inclined conveying plane extending in a conveying direction between a lower infeed end of the conveyor and an opposite upper discharge end at an inclination angle. The rollers are rotatable about axes perpendicular to the conveying direction. The rollers are continuously activated to rotate about their axes in the conveying direction. A lift attached to the upper discharge end changes the inclination angle of the conveying plane.

In another aspect of the invention, a method for destacking a mass of articles comprises: (a) inducting articles into a first zone of rollers rotating in a conveying direction and inclined at an inclination angle that allows top articles carried piggy-back atop bottom articles in contact with the rollers to slide down the articles in contact with the rollers; (b) propelling the bottom articles in contact with the rotating rollers up the inclined rollers to an upper end of the first zone along with any top articles still piggy-backed atop the bottom articles; (c) selectively activating rollers in a second zone of rollers extending in the conveying direction from the upper end of the first zone to propel articles received from the first zone in the conveying direction; (d) selectively deactivating the rollers in the second zone to make them freely rotatable to allow the bottom articles to slide back down the deactivated rollers in the second zone in a direction opposite to the conveying direction and into contact with the roller at the upper end of the first zone to propel the bottom article contacting the roller in the conveying direction and allowing piggy-backed top articles to fall off the bottom article as it reverses direction back into the first zone; and (e) selectively reactivating the rollers in the second zone of rollers to propel the bottom articles received from the first zone in the conveying direction.

DETAILED DESCRIPTION

Figure 1:
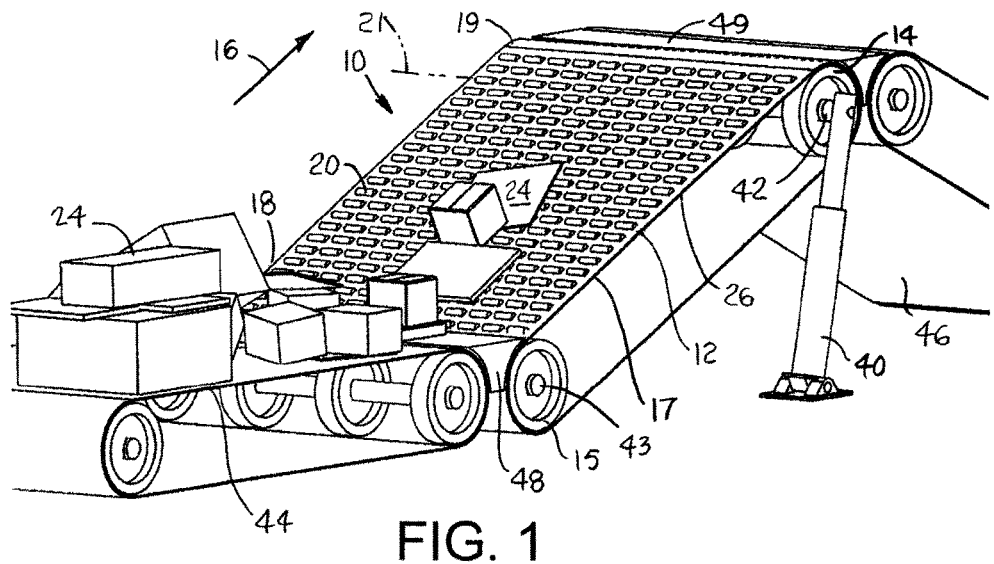
FIG. 1 is an isometric view of a destacking conveyor embodying features of the invention.
Figure 2:
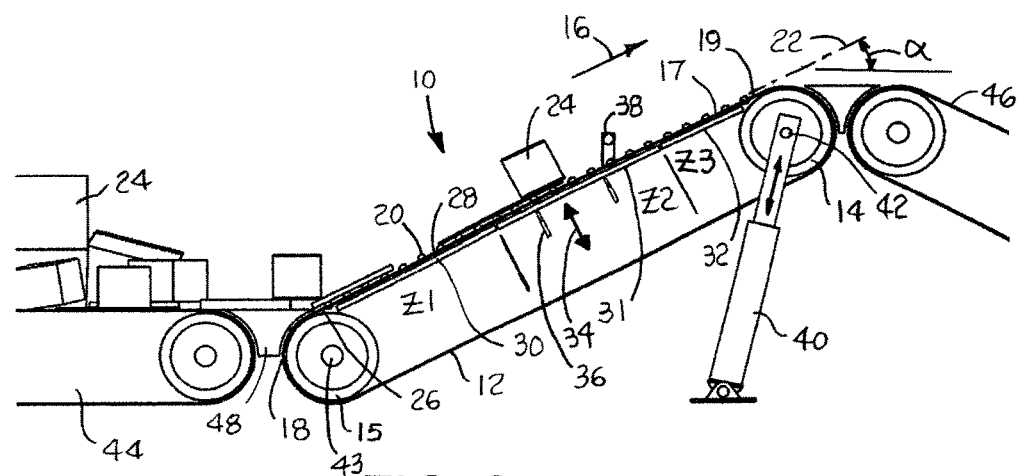
FIG. 2 is a side elevation view of the destacking conveyor of FIG. 1.

One version of a destacking conveyor embodying features of the invention is shown in FIGS. 1 and 2. The destacking conveyor 10 comprises a roller-top conveyor belt 12 trained around drive and idle pulleys or sprockets 14, 15. The roller-top belt 12 is inclined upward along an upper carryway 17 in a conveying direction 16 from a lower infeed end 18 to an upper discharge end 19. The roller-top belt 12, which may be realized by an INTRALOX® Series 400 0° Angled Roller belt manufactured and sold by Intralox, L.L.C., of Harahan, Lo., U.S.A., includes an array of rollers 20 that extend through the thickness of the belt. The rollers rotate on axes 21 that are perpendicular to the conveying direction 16.

The tops of the rollers 20 on the carryway 17 define a conveying plane 22 that is inclined off horizontal by an incline angle α. Articles 24, such as parcels and envelopes, ride atop the belt rollers 20, which may have a high friction outer surface for a better grip on the articles. The bottoms of the belt rollers 20 protrude beyond the bottom surface 26 of the belt along the carryway 17.

As the roller-top belt 12 advances in the conveying direction 16, the rollers 20 roll on bearing surfaces 28 formed on bearing plates 30, 31, 32 lying under the belt on the carryway 17. In this example the three bearing plates 30, 31, 32 divide the carryway into a series of three roller-activation zones Z1, Z2, Z3. By contacting the bottoms of the rollers 20, the bearing surfaces 28 cause the rollers to rotate in the conveying direction. In other words, the tangential velocity of the activated rollers 20 at their apexes relative to the belt 12 is the same as the belt speed and in the conveying direction 16. So articles 24 atop the activated rollers 18 are propelled at an absolute speed of twice the belt speed. The bearing surfaces 28 in the zone Z1 at the lower infeed end 18 and in the zone Z3 at the upper discharge end 19 are stationary and always in contact with the bottoms of the belt rollers 20. The bearing surface 28 of the bearing plate 31 in the middle zone Z2 is movable from an activated position (as shown in FIG. 2) in contact with the bottoms of the belt rollers 20 to a deactivated position out of contact with the rollers as indicated by arrow 34. An actuator 36, such as a linear actuator, coupled to the movable bearing plate 31 selectively moves the bearing surface 28 into and out of contact with the belt rollers 20. When the bearing surface 28 in the middle zone Z2 is moved out of contact with the rollers 20, the rollers are deactivated and can rotate freely on their axes 21. A sensor 38, such as a camera, detects the presence of stacked articles in the middle zone Z2 and sends signals directly to the actuator 36 or indirectly via a controller (not shown) to selectively move the bearing surface 28 in the middle zone Z2 into or out of contact with the rollers 20.

The upper discharge end 19 of the roller-top belt 12 is connected to a lift 40, shown as a pair of cylinders with extensible arms attached to opposite ends of a drive shaft 42, which drives the sprockets 14. The lower infeed end 18 is hinged so that the destacker 10 can pivot about the idle sprockets' idle shaft 43. The lift 40 raises and lowers the upper discharge end 19 of the belt and, in so doing, also adjusts the inclination angle α.

Articles 24 are fed onto the destacking conveyor 10 at the lower end 18 by an infeed conveyor 44 and discharged to a discharge conveyor 46 at the upper end 19. Transfer plates 48, 49 provide transfer surfaces that fill the gaps between the conveyors for a smooth inter-conveyor transfer of the articles 24.

Figure 3A:
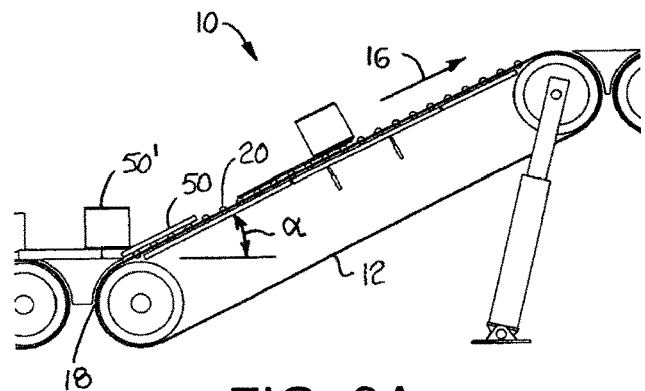
FIGS. 3A-3H depict a sequence of operational steps performed by the destacking conveyor of FIG. 1 to unstack conveyed articles.
Figure 3B:
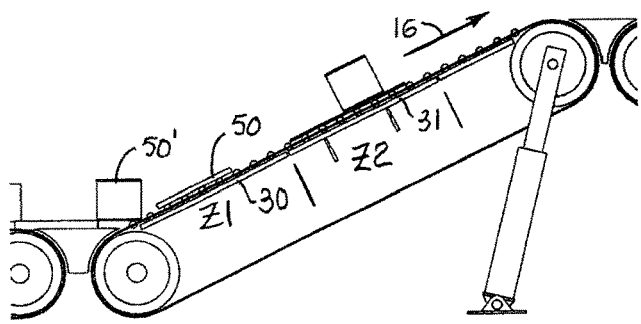
Figure 3C:
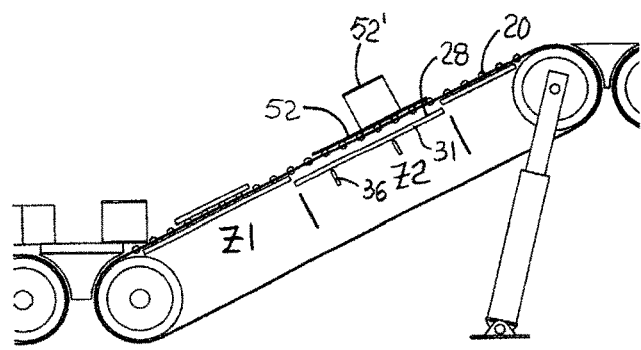
Figure 3D:
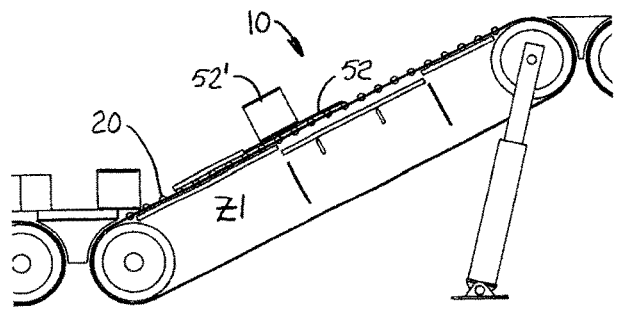
Figure 3E:
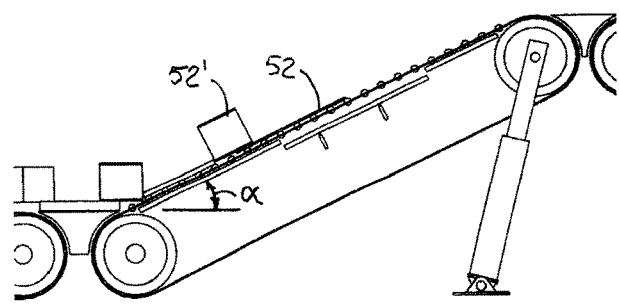
Figure 3F:
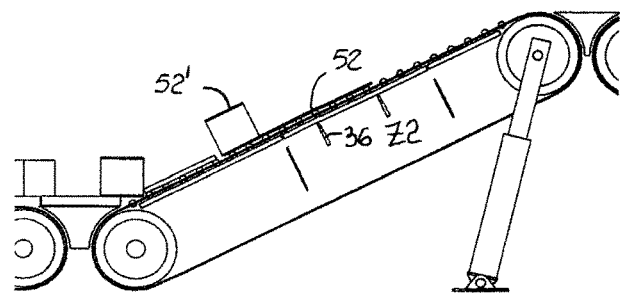
Figure 3G:
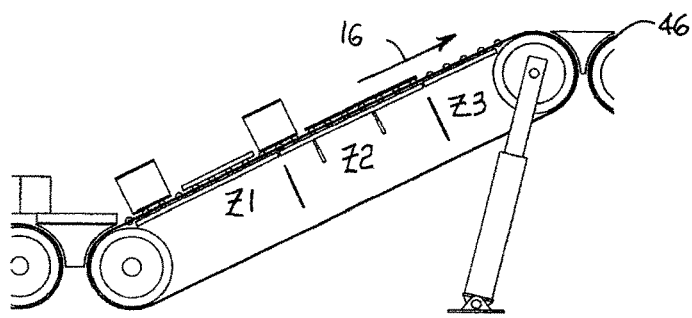

FIGS. 3A-3H depict a typical operational sequence of the destacker 10. FIG. 3A shows the destacker inclined at a steep inclination angle α. Articles, including stacked articles 50, 50', are inducted onto the destacker belt 12 at the lower end 18. The bottom article 50 in the stack is inducted first because the friction between the bottom article and the high-friction belt rollers 20 is greater than the friction between the bottom article and the top article 50'. So the bottom article 50, conveyed in the conveying direction 16 by the destacker belt 12, is pulled from beneath the top article 50' as shown in FIG. 3B and is propelled forward by the rollers 20 in the lower zone Z1 activated by the stationary bearing surface of the bearing plate 30. In the middle zone Z2 the movable bearing plate 31 is shown in the roller-activating position propelling a pair of piggy-backed articles 52, 52' through the zone in the conveying direction 16. In FIG. 3C the actuator 36 has moved the bearing plate 31 in the middle zone Z2 to the deactivate position with the bearing surface 28 out of contact with the belt rollers 20, which allows the rollers in the middle zone to rotate freely on their axes. This causes the stacked articles 52, 52', aided by gravity, to slide down the destacker carryway toward the lower zone. When the bottom article 52 has retreated down the destacker 10 far enough for its trailing end to contact the activated belt rollers 20 in the lower zone Z1, contact with the activated rollers stops the bottom article 52 from moving farther downward. But the top article 52' continues to slide downward along the top of the bottom article 52 and into the lower zone Z1 because of relatively low-friction contact with the bottom article and the steep inclination angle α, as shown in FIG. 3E. The actuator 36 then moves the bearing plate 31 back into contact with the belt rollers 20 passing through the middle zone Z2. The forward rotation of the activated rollers 20 in the middle zone Z2 pulls the bottom article 52 from under the top article 52', as shown in FIG. 3F, until they are separated and no longer piggy-backed, as shown in FIG. 3G. With all the zones Z1, Z2, Z3 activated, the separated articles are propelled forward in the conveying direction 16 to the discharge conveyor 46.

Figure 3H:
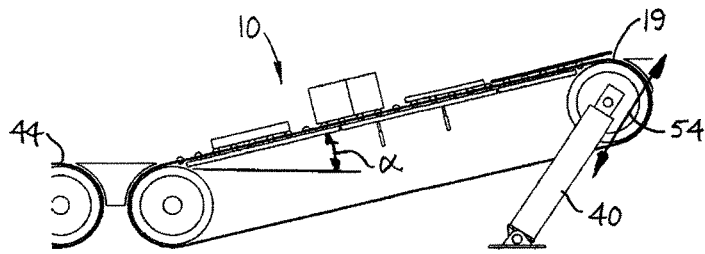

The sequence depicted in FIGS. 3A-3G can be repeated cyclically at regular intervals or as determined by the stacked-article sensor 38 (FIG. 2). As the number of articles inducted onto the destacking conveyor 10 from the infeed conveyor 44 starts to dwindle, the lift 40 moves the upper discharge end 19 down, as shown in FIG. 3H, to reduce the inclination angle α and the reversing effect of gravity on the forward progress of the articles. The lift 40 can also be modulated rapidly back and forth as indicated by arrow 54 to jostle the articles and help them separate.

Figure 4A:
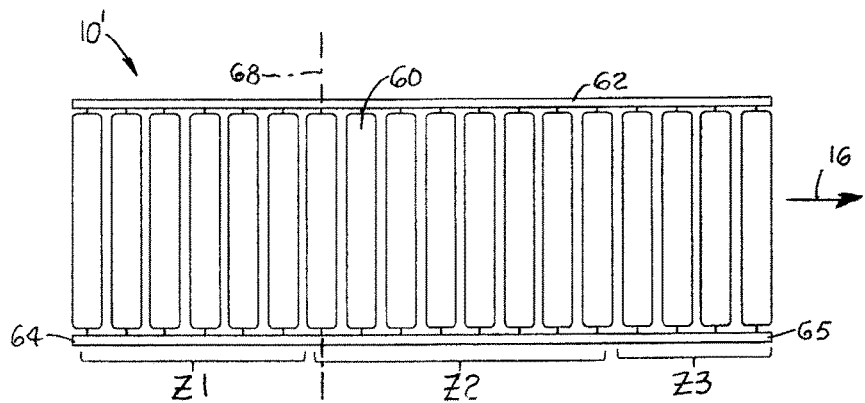
FIGS. 4A and 4B are top plan and side elevation views of a destacking conveyor as in FIG. 1 realized by a roller conveyor rather than a roller-top conveyor belt.
Figure 4B:
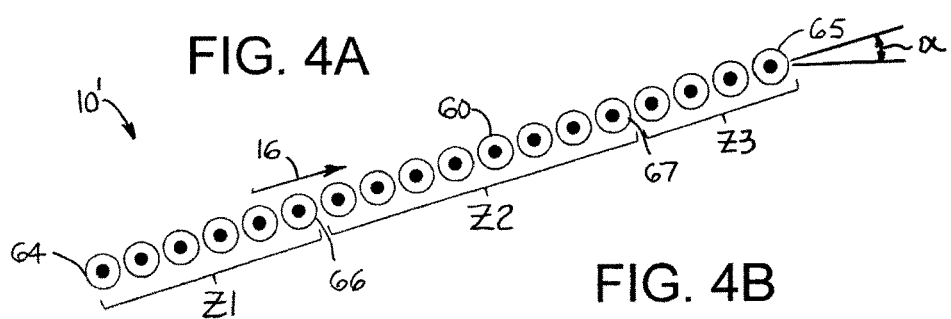

A similar destacking is achieved with a destacking conveyor 10' constructed of a roller conveyor as shown in FIGS. 4A and 4B. In this version, the destacking conveyor 10' comprises a series of parallel rollers 60 mounted in a conveyor frame 62 inclined from a lower infeed end 64 to an upper discharge end 65. As for the belt conveyor, the roller conveyor 10' is divided into three zones Z1, Z2, Z3 in the conveying direction 16. The first zone Z1 extends upward from the lower infeed end 64 of the destacking conveyor 10' to an upper end 66. The rollers in the first zone are continuously activated to rotate in a forward direction on their axles about axes 68 perpendicular to the conveying direction 16 to propel articles toward the upper discharge end 65. Each of the rollers 60 in the first zone Z1 can be motorized, or one or more can be motorized to power one or more idle rollers in the zone via transmission belts or gears. The rollers 60 in the second zone Z2 are selectively activated to rotate in the forward direction and deactivated to rotate freely on their axes 68—just like the belt rollers 20 passing through the middle zone Z2 in FIGS. 3A-3H. Similarly, the rollers 60 in the upper third zone Z3, which extends from the upper end 67 of the second zone Z2 to the upper discharge end 65 of the conveyor 10', are continuously activated to rotate in the forward direction like the rollers in the first zone Z1. Like the belt conveyor 10 of FIG. 2, the roller conveyor 10' can include a lift at the upper end 65 and a hinge at the lower end 64 to change the inclination angle α. And, like the belt rollers, the roller-conveyor rollers could have a high-friction outer surface for a better grip on the incline.

Although the invention has been described with reference to a couple of specific versions, others are possible. For example, the upper zone Z3 may not be necessary in all applications. On the other hand, more than three zones may be required. These zones could alternate between continuously activated zones and selectively activated-deactivated zones. Or multiple destacking conveyors can be cascaded to increase the destacking length and the percentage of destacking achieved.

What is claimed is:

1. A destacking conveyor comprising:
a lower infeed end and an opposite upper discharge end;
an array of rollers arranged to form an inclined conveying plane extending in a conveying direction from the lower infeed end to the upper discharge end at an inclination angle, wherein the rollers are rotatable about axes perpendicular to the conveying direction, the array of rollers including:

a first set of the rollers in a first zone extending in the conveying direction from the lower infeed end a first distance defining the upper end of the first zone, wherein the first set of rollers in the first zone are continuously activated to rotate in the conveying direction;

a second set of the rollers in a second zone extending in the conveying direction from the upper end of the first zone a second distance defining the upper end of the second zone;

an actuator for selectively activating the second set of rollers in the second zone to rotate in the conveying direction and selectively deactivating the second set of rollers to rotate freely about their axes.

2. A destacking conveyor as in claim 1 wherein the array of rollers further includes a third set of the rollers in a third zone extending in the conveying direction from the upper end of the second zone to the upper discharge end and wherein the third set of rollers in the third zone are continuously activated to rotate in the conveying direction.

3. A destacking conveyor as in claim 1 further comprising a lift attached to the upper discharge end to change the inclination angle of the conveying plane.

4. A destacking conveyor as in claim 1 further comprising a sensor detecting stacked articles in the second zone and sending a signal to the actuator to deactivate or activate the second set of the rollers.

5. A destacking conveyor as in claim 1 further comprising a first bearing surface associated with the first set of the rollers in the first zone and a second bearing surface associated with the second set of the rollers in the second zone and an actuator and wherein the array of rollers are arranged on a conveyor belt advancing in the conveying direction and wherein the first set of the rollers are activated by rolling on first bearing surface and wherein the actuator selectively activates and deactivates the second set of rollers by moving the second bearing surface into and out of contact with the second set of rollers in the second zone.

6. A destacking conveyor as in claim 1 wherein the array of rollers form a roller conveyor in which the first set of the rollers in the first zone are continuously activated and the second set of the rollers in the second zone are selectively activated and deactivated.

7. A destacking conveyor as in claim 1 wherein the rollers have a high-friction outer surface.

8. A method for destacking a mass of articles, the method comprising:
(a) inducting articles into a first zone of rollers rotating in a conveying direction and inclined at an inclination angle that allows top articles carried piggy-back atop bottom articles in contact with the rollers to slide down the articles in contact with the rollers;
(b) propelling the bottom articles in contact with the rotating rollers up the inclined rollers to an upper end of the first zone along with any top articles still piggy-backed atop the bottom articles;
(c) selectively activating rollers in a second zone of rollers extending in the conveying direction from the upper end of the first zone to propel articles received from the first zone in the conveying direction;
(d) selectively deactivating the rollers in the second zone to make them freely rotatable to allow the bottom articles to slide back down the deactivated rollers in the second zone in a direction opposite to the conveying direction and into contact with the roller at the upper end of the first zone to propel the bottom article contacting the roller in the conveying direction and allowing piggy-backed top articles to fall off the bottom article as it reverses direction back into the first zone;
(e) selectively reactivating the rollers in the second zone of rollers to propel the bottom articles received from the first zone in the conveying direction.

9. The method of claim 8 further comprising receiving articles from the second zone in a third zone of rotating rollers to propel the articles through the third zone in the conveying direction.

10. The method of claim 8 further comprising detecting the presence of piggy-backed top articles in the second zone and deactivating the rollers in the second zone when piggy-backed top articles are detected.

11. The method of claim 8 further comprising lowering the inclination angle as the supply of articles dwindles.

12. The method of claim 8 further comprising changing the inclination angle rapidly back and forth to help jostle piggy-backed top articles off bottom articles.

13. A destacking conveyor comprising:
a roller-top conveyor belt advancing in a conveying direction along a carryway inclined at an inclination angle from a lower infeed end to an upper discharge end wherein the roller-top conveyor belt includes a plurality of article-supporting rollers extending through the thickness of the roller-top conveyor belt;
a first stationary bearing surface underlying the roller-top conveyor belt in a first zone extending in the conveying direction from the lower infeed end to an upper end of the first zone, wherein the rollers passing through the first zone roll on the first stationary bearing surface to propel articles atop the rollers along the roller-top conveyor belt in the conveying direction;
a second bearing surface underlying the roller-top conveyor belt in a second zone extending in the conveying direction from the upper end of the first zone to an upper end of the second zone, wherein the second bearing surface is movable from a first position in contact with the rollers passing through the second zone to a second position out of contact with the rollers;
an actuator for selectively activating the rollers passing through the second zone to rotate in the conveying direction by moving the second bearing surface to the first position and selectively deactivating the rollers passing through the second zone to rotate freely about their axes by moving the second bearing surface to the second position.

14. A destacking conveyor as in claim 13 further comprising a third stationary bearing surface underlying the roller-top conveyor belt in a third zone extending in the conveying direction from the upper end of the second zone to the upper discharge end, wherein the rollers passing through the third zone roll on the third stationary bearing surface to propel articles atop the rollers along the roller-top conveyor belt in the conveying direction.

15. A destacking conveyor as in claim 13 further comprising a lift attached to the upper discharge end to change the inclination angle.

16. A destacking conveyor as in claim 13 further comprising a sensor detecting piggy-backed articles in the second zone and sending a signal to the actuator to move the second bearing surface to deactivate or activate the rollers passing through the second zone.

17. A destacking conveyor as in claim 13 wherein the rollers have a high-friction outer surface.

18. A destacking conveyor comprising:
a lower infeed end and an opposite upper discharge end;

a set of rollers arranged to form an inclined conveying plane extending in a conveying direction between the lower infeed end and the upper discharge end at an inclination angle, wherein the rollers are rotatable about axes perpendicular to the conveying direction, wherein the rollers are continuously activated to rotate in the conveying direction;

a lift attached to the upper discharge end to change the inclination angle of the conveying plane;

wherein the lift changes the inclination angle rapidly back and forth to help jostle piggy-backed top articles conveyed atop the rollers off bottom articles.

19. A destacking conveyor as in claim 18 wherein the set of continuously activated rollers defines a first roller-activation zone and wherein the destacking conveyor further comprises:

a second set of rollers rotatable about axes perpendicular to the conveying direction and defining a second roller-activation zone in series with the first roller-activation zone;

an actuator for selectively activating the second set of rollers in the second zone to rotate about their axes in the conveying direction and selectively deactivating the second set of rollers to rotate freely about their axes.

* * * * *